United States Patent [19]

Chen et al.

[11] Patent Number: 5,040,865

[45] Date of Patent: Aug. 20, 1991

[54] FREQUENCY MULTIPLYING ELECTRO-OPTIC MODULATOR CONFIGURATION AND METHOD

[75] Inventors: Chung Y. Chen, Rancho Palos Verdes; Irwin L. Newberg, Northridge, both of Calif.

[73] Assignee: Hughes Aircraft Company, Los Angeles, Calif.

[21] Appl. No.: 512,287

[22] Filed: Apr. 20, 1990

[51] Int. Cl.$^5$ ............................ G02B 6/10; G02F 2/00
[52] U.S. Cl. .............................. 350/96.14; 350/96.15
[58] Field of Search ............... 350/96.12, 96.13, 96.14, 350/96.15

[56] References Cited

U.S. PATENT DOCUMENTS

| | | | |
|---|---|---|---|
| 4,768,848 | 9/1988 | Vaerewyck | 350/96.14 X |
| 4,871,223 | 10/1989 | Auracher et al. | 350/96.14 |
| 4,882,775 | 11/1989 | Coleman | 350/96.14 X |
| 4,887,884 | 12/1989 | Hayden | 350/96.29 |
| 4,936,644 | 6/1990 | Raskin et al. | 350/96.14 |
| 4,947,170 | 8/1990 | Falk | 350/96.14 X |

OTHER PUBLICATIONS

Alferness, Rod C.; "Guided-Wave Devices for Optical Communication"; IEEE Journal of Quantum Electronics; vol. QE-17, No. 6; Jun. 1981; pp. 946-959.
Herczfeld, Peter R., et al.; "Indirect Subharmonic Optical Injection Locking of a Millimeter-Wave IMPATT Oscillator"; IEEE Transactions on Microwave Theory and Techniques; vol. MTT-34, No. 12; Dec. 1986; pp. 1371-1376.
Hinton, H.; "Photonic Switching Using Directional Couplers"; IEEE Communications Magazine; vol. 25, No. 5; May 1987.
Lau, K. Y., et al.; "Intermodulation Distortion in a Directly Modulated Semiconductor Injection Laser"; Applied Physics Letters; vol. 45, No. 10; Nov. 15, 1984; pp. 1034-1036.
Martin, W.; "A New Waveguide Switch/Modulator for Integrated Optics"; Applied Physics Letters; vol. 26, No. 10; May 1975; pp. 562-564.

*Primary Examiner*—John D. Lee
*Assistant Examiner*—Stephen W. Barns
*Attorney, Agent, or Firm*—Terje Gudmestad; Jeannette M. Walder; Wanda K. Denson-Low

[57] ABSTRACT

In a Mach-Zehnder electro-optic modulator (10), an optical waveguide (14) includes two branches (20,22) extending between an optical input (16) and an optical output (18) is formed in a substrate (12) of a material having electro-optical properties. An electrical signal applied to a modulation input (34) affects the material such that the effective optical lengths of the branches (20,22) vary differently in correspondence with the magnitude of the electrical signal. The optical signals propagating through the branches (20,22) interfere with each other at the optical output (18) at a phase angle depending on the difference between the effective optical lengths. A selected electrical bias voltage applied to the modulation input (34) causes non-linear modulation of an input optical signal with one or more even integral multiples of an electrical input signal which is additionally applied to the modulation input (34), thereby providing frequency multiplication. Two or more non-linearly operated modulators (50) may be connected in cascade to increase the multiplication ratio, with a photodetection (80) converting the optical output of one modulator to an electrical signal which is applied to the modulation input of the next modulator. One linearly operated modulator (100) may be connected in cascade with a non-linearly operated modulator to modulate a frequency multiplied carrier with a data signal. In an alternative configuration, the Mach-Zehnder modulator may be replaced by a directional coupler (130) adapted to produce frequency multiplication when operated non-linearly.

20 Claims, 3 Drawing Sheets

FREQUENCY MULTIPLYING ELECTRO-OPTIC MODULATOR CONFIGURATION AND METHOD

BACKGROUND OF THE INVENTION

1. Field of the Invention

The present invention generally relates to the art of optical communications, and more specifically to an electro-optic modulator configuration and method which enable modulation of an optical carrier with electrical signals having extremely high frequencies.

2. Description of the Related Art

Transmission of signals using optical carriers enables very high bandwidths and numbers of multiplexed channels with low signal loss and distortion. A coherent laser light beam is generally modulated with an optical signal, and propagates to a remote receiver either directly through the atmosphere, or via a system of optical fibers and repeaters. The maximum frequency with which an optical carrier or light beam can be modulated determines the bandwidth limitation of an optical communications system. At the present state of the art, generation and transmission of extremely high frequency (EHF) microwave signals in the millimeter wave frequency band of approximately 20 to 100 GHz has not been attainable in practical applications. Semiconductor diode lasers, which are suitable for generating optical carriers for fiber-optic communications, have not been capable of modulation with EHF frequencies at the present state of the art. Examples of attempts at high frequency modulation of semiconductor diode lasers is documented in an article entitled "Intermodulation distortion in a directly modulated semiconductor injection laser", by K. Lau, Applied Physics Letters vol. 45, no. 10, pp. 1034–1036, (Nov. 15, 1984), and further in an article entitled "Indirect Subharmonic Optical Injection Locking of a Millimeter-Wave IMPATT Oscillator", by P. Herczfeld, in IEEE Transactions on Microwave Theory and Techniques, vol. MTT-34, no. 12, pp. 1371–1375, (Dec. 1976). However, this approach has low efficiency, produces modulated signals with a weak harmonic content (less than −20 dBc), and also substantially reduces the operating lifetime of the laser.

SUMMARY OF THE INVENTION

The present invention utilizes a Mach-Zehnder or other applicable type of electro-optic modulator to modulate an optical carrier with an electrical signal at frequencies which have been unattainable in practical application. Operation of the modulator in a non-linear region at which frequency multiples or harmonics of an input electrical signal are generated is utilized to modulate an optical signal with a frequency which is an even integral multiple of the frequency of the input signal. This enables transmission of microwave signals in the millimeter wave frequency band of 20 to 100 GHz at heretofore unattainable frequencies of typically 44 and 88 GHz.

The modulator configuration and method of operation embodying the present invention further includes connection of two or more electro-optic modulators in cascade to provide greater frequency multiplication than is practical with one stage, and to enable linear modulation by one modulator of a frequency multiplied optical signal produced by another modulator.

In accordance with the present invention, a Mach-Zehnder modulator includes an optical waveguide having two branches extending between an optical input and an optical output, formed in a substrate of a material having electro-optical properties. An electrical signal applied to a modulation input affects the material such that the effective optical lengths of the branches vary differently in correspondence with the magnitude of the electrical signal. The optical signals propagating through the branches interfere with each other at the optical output at a phase angle depending on the difference between the effective optical lengths. A selected electrical bias voltage applied to the modulation input causes non-linear modulation of an input optical signal with one or more even integral multiples of an electrical input signal which is additionally applied to the modulation input, thereby providing frequency multiplication. Two or more non-linearly operated modulators may be connected in cascade to increase the multiplication ratio, with a photodetector converting the optical output of one modulator to an electrical signal which is applied to the modulation input of the next modulator. One linearly operated modulator may be connected in cascade with a non-linearly operated modulator to modulate a frequency multiplied carrier with a data signal. In an alternative configuration, the Mach-Zehnder modulator may be replaced by a directional coupler or other electro-optical device adapted to produce frequency multiplication when operated non-linearly.

These and other features and advantages of the present invention will be apparent to those skilled in the art from the following detailed description, taken together with the accompanying drawings, in which like reference numerals refer to like parts.

DETAILED DESCRIPTION OF THE INVENTION

A Mach-Zehnder electro-optic modulator per se is known in the art, as presented in an article entitled "A new waveguide switch/modulator for integrated optics", by W. Martin, Applied Physics Letters, vol. 26, no. 10, pp. 562–564 (May 1975). This article describes the two applications for which Mach-Zehnder modulators have been used in the past; as an optical switch, and as a linear modulator. The present invention utilizes a Mach-Zehnder modulator in a non-linear mode which has been heretofore unappreciated, enabling modulation of an optical beam with electrical signals at extremely high frequencies which have been unattainable using conventional techniques.

Figure 1:
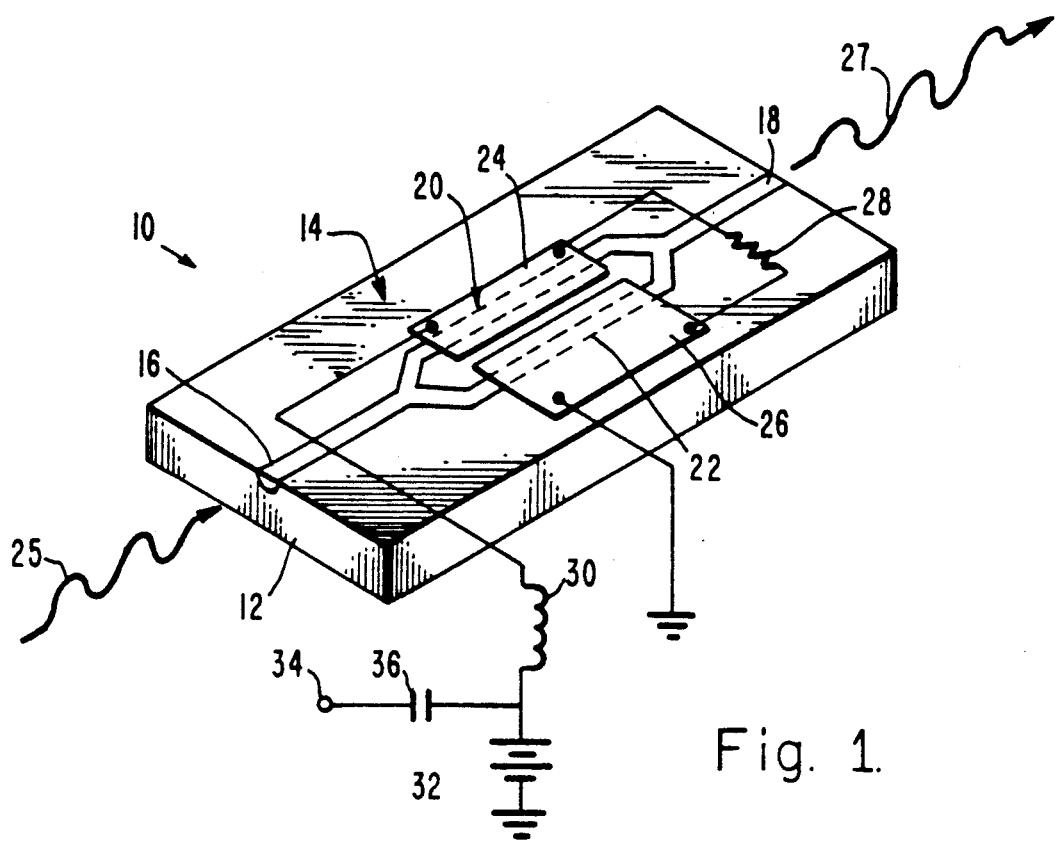
FIG. 1 is a schematic diagram of a Mach-Zehnder type electro-optic modulator configured to operate in accordance with the present invention.

Referring now to FIG. 1 of the drawing, an electro-optic modulator based on a Mach-Zehnder interferometer is generally designated as 10, and includes a monolithic substrate 12 formed of an electro-optic material such as LiNbO$_3$ or ZnSe. Ann optical waveguide 14 is formed in the substrate 12, having an optical input 16, an optical output 18, and two arms or branches 20 and 22 which extend generally in parallel with each other between the input 16 and output 18. The waveguide 14 may be formed by diffusion of titanium, cadmium, or other material into the substrate 12 through a mask (not shown), so that the index of refraction of the material in the waveguide 14 is higher than the index of refraction of the material of the substrate 12.

A first electrode 24, made of an electrically conductive metal such as gold, is formed over the branch 20, whereas a second electrode 26 is formed over the branch 22. An impedance matching resistor 28 may be connected between the electrodes 24 and 26. The electrode 26 is grounded, whereas the electrode 24 is connected through an inductor 30 to a bias voltage source 32. An electrical modulation input terminal 34 is connected through a capacitor 36 to the junction between the inductor 30 and voltage source 32.

The branches 20 and 22 have equal lengths. In the absence of an electrical voltage applied across the electrodes 24 and 26, an input optical or light beam 25 produced by a laser or the like (not shown) applied to the optical input 16 of the waveguide 14 divides equally between the branches 20 and 22. The optical signals propagating through the branches 20 and 22 recombine at the optical output 18 of the waveguide 14 in phase with each other, such that their amplitudes are additive and an optical output signal 27 which is essentially similar to the optical input signal 25 appears at the optical output 18. This corresponds to "first-order mode" operation as described in the article to Martin.

Application of a predetermined electrical bias voltage differential V$\pi$ across the electrodes 24 and 26 causes the indices of refraction of the material in the branches 20 and 22 to vary differently due to the electro-optic effect, such that the effective optical lengths of the branches 20 and 22 vary accordingly. At the bias voltage V$\pi$, the effective optical lengths have varied to an extent such that the optical signals passing from the branches 20 and 22 into the optical output 18 are 180° out of phase with each other. The amplitudes of the signals combine subtractively, cancelling each other out, such that a zero output is produced at the optical output 18. This corresponds to "second-order mode" operation described in the article to Martin.

Figure 2:
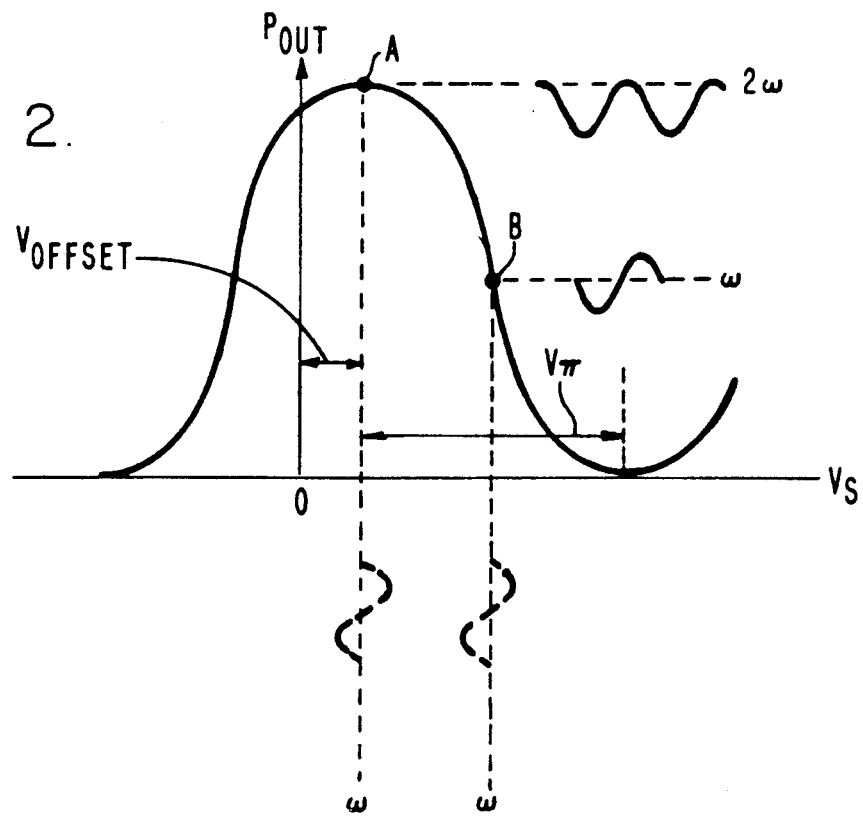
FIG. 2 is a graph illustrating the external modulator transfer function of the modulator of FIG. 1.

FIG. 2 is a graph of the external modulator transfer function of a Mach-Zehnder modulator, illustrating the principles of the present invention. The transfer function has the form of a cosine square curve, with the horizontal axis representing a voltage Vs applied to the electrode 24 relative to the electrode 26, and the vertical axis representing the optical output power Pout of the modulator.

The transfer function of the modulator is Pout+- Pmax cos$^2$ [$\pi$·(Vs-Voffset)/2V$\pi$], where Pmax is maximum output light intensity, which is closely related to the input light intensity, and V$\pi$ is the input voltage which produces a 180° phase shift between the two branches 20 and 22.

For linear operation of the modulator as practiced in the prior art, a bias voltage applied to the electrode 24 is set to a point B. As viewed in the drawing, in response to an electrical input signal having a frequency $\omega$ applied to the electrode 24 in addition to the bias voltage at the point B, a signal appearing at the optical output 18 includes the optical input signal which is linearly modulated with an electrical signal of the frequency $\omega$. The amplitude of the signal Vs applied to the modulation input terminal 34 is equal to the bias voltage plus the instantaneous amplitude of the electrical input signal. Modulation occurs since the relative indices of refraction of the material in the branches 20 and 22, and thereby the relative phase of the optical signals emerging from the branches 20 and 22, varies in correspondence with the instantaneous amplitude of the electrical input signal. The varying phase angle results in varying interference between the optical signals, and thereby a varying value of amplitude of the optical output signal 27.

In accordance with the present invention, the bias voltage source 32 is selected to apply a bias voltage having a value Voffset to the electrode 24, such that the modulator is biased at the extreme amplitude value or point A of the cosine square curve. The extreme amplitude bias point A may be referred to as the "clamping" operating point of the modulator. Operation of the modulator in this region produces non-linear electro-optic response of the material in the waveguide 14, such that in response to an electrical input signal having a frequency $\omega$ applied to the electrode 24 in addition to the bias voltage at the point A, a signal appearing at the optical output 18 includes the optical input signal which is non-linearly modulated with an electrical signal having a fundamental frequency 2$\omega$. In addition, one or more even integral multiples of the input signal frequency $\omega$ in addition to the fundamental frequency 2$\omega$, such as harmonic frequencies 4$\omega$, 8$\omega$, etc. may be generated. Where the frequency of the input signal $\omega$=11 GHz, the fundamental frequency of the non-linear modulated output signal will be 2$\omega$=22 GHz, and the frequency of the first harmonic of the fundamental output frequency will be 4$\omega$=44 GHz. Where only one modulated output frequency is desired, the unwanted even integral multiples or harmonics can be blocked by a suitable bandpass filter (not shown).

Figure 3:
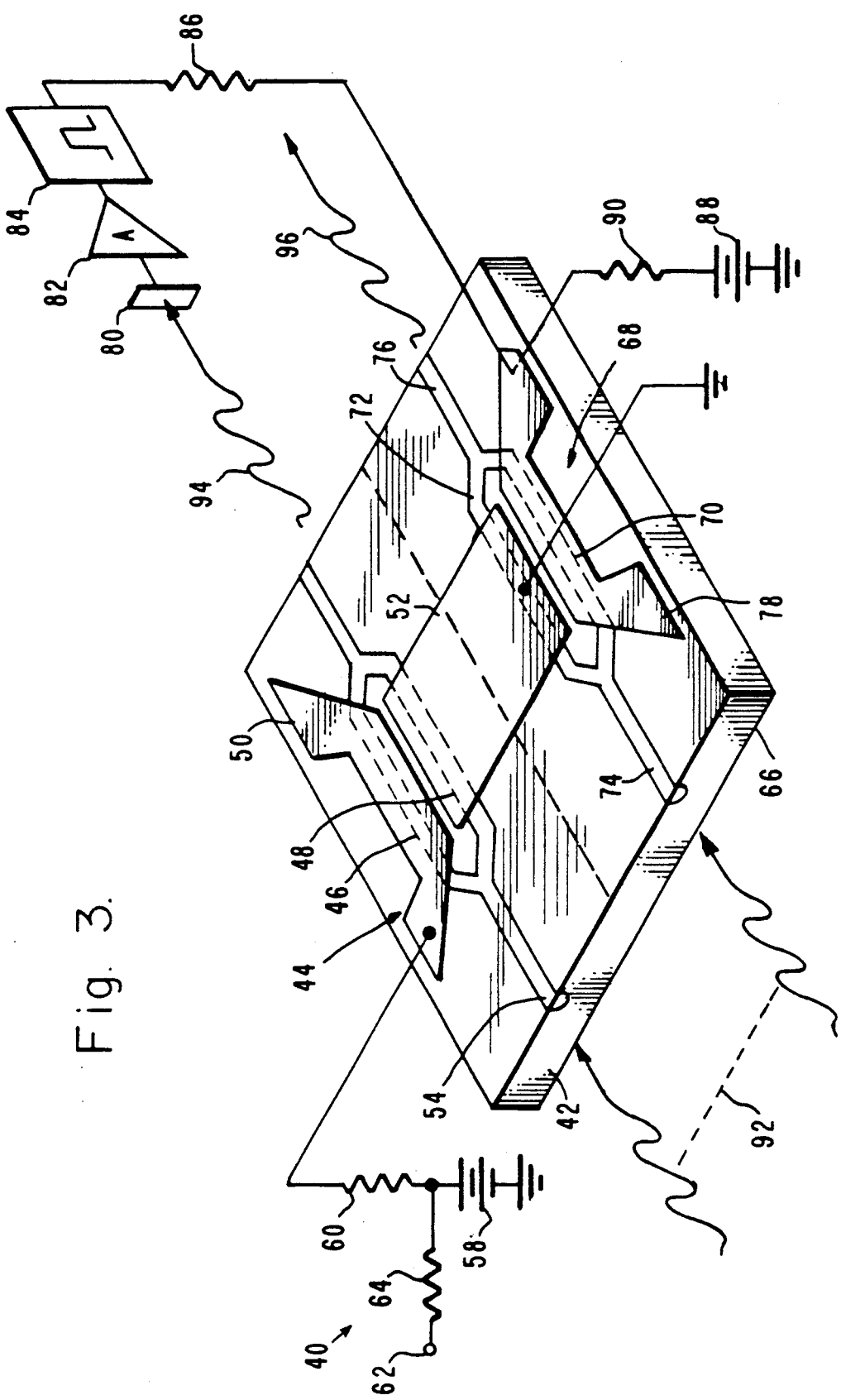
FIG. 3 is a schematic diagram illustrating two modulators connected in cascade to produce an increased value of frequency multiplication.

FIG. 3 illustrates another modulator 40 embodying the present invention which is capable of generating yet higher multiples of an electrical input frequency. The modulator 40 includes a first substrate 42 in which is formed a first waveguide 44 having branches 46 and 48 in a manner essentially similar to that described with reference to FIG. 1. A first electrode 50 is formed over the branch 46, whereas a second electrode 52 is formed over the branch 48. The waveguide 44 further has an optical input 54 and an optical output 56. A bias voltage source 58 applies a bias voltage to the electrode 50 via a resistor 60 which is predetermined to bias the electrode 50 at the non-linear extreme amplitude point A in FIG. 2. An electrical input signal is applied to the electrode 50 in addition to the bias voltage via a modulation input terminal 62 and a resistor 64.

The modulator 40 further includes a second substrate 66, in which is formed a waveguide 68, having first and second branches 70 and 72, an optical input 74, and an optical output 76. The electrode 52 extends over the branch 72, whereas an electrode 78 is formed over the branch 70. The optical output 56 of the waveguide 44 is connected to the optical input of a photodetector 80, the electrical output of which is connected through an amplifier 82, bandpass filter 84, and resistor 86, to the electrode 78. A bias voltage source 88 applies a bias voltage to the electrode 78 via a resistor 90 which is predetermined to bias the electrode 78 at the non-linear extreme amplitude point A in FIG. 2.

The substrates 42 and 66 may be separate, and formed of different electro-optic materials selected to produce optimal performance under their particular conditions of operation. Alternatively, the substrates 42 and 66 may be formed of the same material, and constituted by a monolithic structure. As yet another alternative, the substrates 42 and 66 may be integral, but have different characteristics due to diffusion or the like of different materials therein.

In operation, an optical input signal 92 is applied to the optical inputs 54 and 74 in parallel. An electrical input signal is applied to the input terminal 62 having a frequency of, for example, 11 GHz. The optical signal propagating through the waveguide 44 is modulated by the non-linearly generated fundamental frequency of 22 GHz as well as possible higher order even multiple harmonics such as 44 GHz, 88 GHz, etc., to constitute an optical output beam 94 which is incident on the photodetector 80. An electrical signal produced at the output of the photodetector 80 is applied to the electrode 78 of the modulator 68 via the amplifier 82 and filter 84 which, for example, may be designed to block all harmonics above 44 GHz.

The optical signal propagating through the waveguide 68 is modulated by the 44 GHz and 88 GHz frequency components of the electrical output signal from the photodetector 80. An optical output signal 96 appearing at the optical output 76 of the waveguide 68 includes a nonlinearly generated fundamental frequency of 44 GHz and a first harmonic of 88 GHz, in addition to other possible even integral multiple harmonics. Thus, a minimum frequency multiplication factor of 4 times is produced by the modulator 40. Additional non-linear modulator stages may be connected in cascade to the optical output 96 to produce even greater frequency multiplication, although not illustrated.

Figure 4:
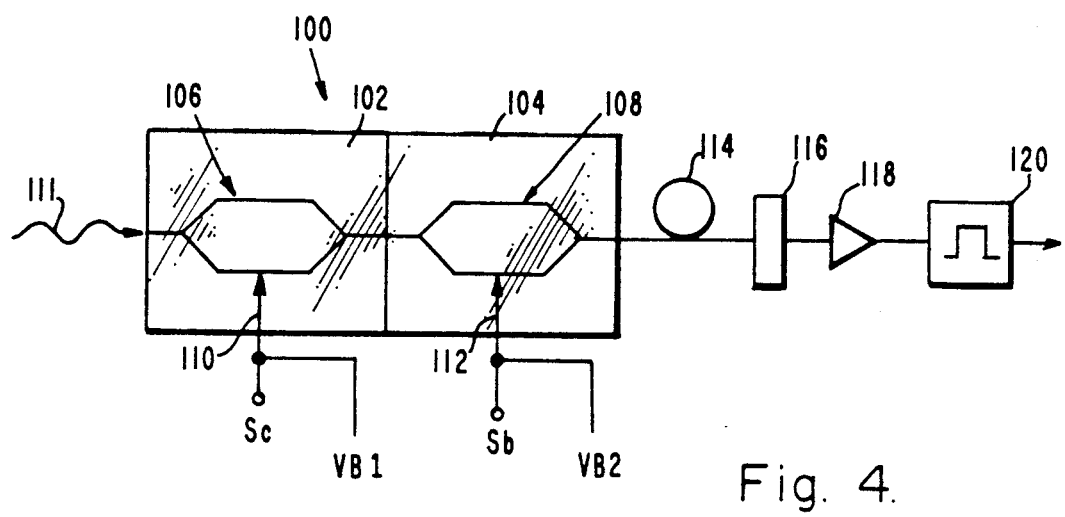
FIG. 4 is a simplified schematic diagram illustrating two modulators connected in cascade to enable linear modulation by one modulator of a frequency multiplied signal produced by a second modulator.

FIG. 4 is a simplified view of another modulator 100 embodying the present invention, including first and second substrates 102 and 104, which may or may not be integral and monolithic as discussed above with reference to FIG. 3. First and second waveguides 106 and 108 having configurations essentially similar to that described above with reference to FIG. 1 are formed in the substrates 102 and 104 respectively. The optical output of the waveguide 106 is connected to the optical input of the waveguide 108. The modulators 102 and 104 further have electrical inputs 110 and 112 which correspond to the electrode 24 of FIG. 1. An electrical carrier signal Sc is applied to the input 110 in addition to a first bias voltage VB1. An electrical data signal SD is applied to the input 112 in addition to a second bias voltage VB2. An optical input signal 111 is applied to the optical input of the waveguide 106.

The bias voltage VB1 is selected to have a value corresponding to the non-linear bias point A, whereas the bias voltage VB2 is selected to have a value corresponding to the linear bias point B of FIG. 2. Assuming that the carrier signal SC has a frequency of 11 GHz, the optical signal fed from the first waveguide 106 into the second waveguide 108 will be modulated with a fundamental frequency of 22 GHz, and may include harmonics of 44 GHz, etc.

The data signal SD contains information with which the carrier signal SC is to be modulated. Due to selection of the bias voltage VB2 at the linear operation point B, the even integral multiple frequencies of 22 GHz, 44 GHz, etc., are all modulated linearly by the fundamental frequency of the data signal SD. This configuration enables generation of integral multiple output frequencies by operating one modulator in the non-linear mode, and linear modulation of the multiple output frequencies using another modulator operating in the linear mode. Further illustrated in FIG. 4 are an optical fiber 114, photodetector 116, amplifier 118, and bandpass filter 120 connected to the optical output of the waveguide 108.

A configuration of the modulator 100 in which the substrates 102 and 104 are made of the same material and are monolithic, with the material being capable of both linear and non-linear electro-optical response as illustrated in FIG. 2, is a preferred embodiment of the present invention. However, it might be desirable in some applications to form the substrates 102 and 104 of different materials. The substrate 102 may be formed of a material which exhibits especially good non-linear response, whereas the substrate 104 may be formed of a material which exhibits especially good linear response.

The following mathematical derivation illustrates the operation of a Mach-Zehnder electro-optic modulator as a perfect even harmonic generator.

The transfer function of a Mach-Zehnder modulator can be expressed as:

$$Pout = Pmax \cos^2 [(\pi \cdot Vs - Voffset)/2V\omega] \quad (1)$$

Assuming that the modulator is biased at the peak of the cosine square curve, i.e.

$$Vs = Voffset + Vm \sin \omega t \quad (2)$$

Combination of equations (1) and (2) gives $$Pout + Pmax [\tfrac{1}{2} + \cos(a \cdot \sin \omega t)] \quad (3)$$

where $a = \omega \cdot Vm/V\pi$

Application of the Jacobbi-Anger expansion produces $$\cos(a \cdot \sin \theta) = J_0(a) + 2 \sum_{n=1}^{\infty} J_{2n}(a) \cos(2n\theta) \quad (4)$$

where $J_n$ is the Bessel function of the first kind of order n.

Combining equations (3) and (4) produces $$Pout = Pmax \\ (\tfrac{1}{2} + J_0(a) + 2J_2(a)/\cos(2\omega t) + 2J_4(a)/\cos(4\omega t) + \ldots ] \quad )5)$$

The conclusion of the above derivation indicates that a Mach-Zehnder modulator biased at the peak of the cosine square wave curve is an ideal even harmonic generator. It is interesting to note that the relative strength of the 4th harmonic with respect to the 2nd harmonic increases as a modulation index m increases. For example:

For m=50%, 4th harmonic/2nd harmonic=22%
For m=100%, 4th harmonic/2nd harmonic=30%
For m=100%, 4th harmonic/2nd harmonic=40%

In theory, the Mach-Zehnder modulator will become a fourth harmonic generator when the modulation index m=164%, at which value the second harmonic term vanishes.

Figure 5:
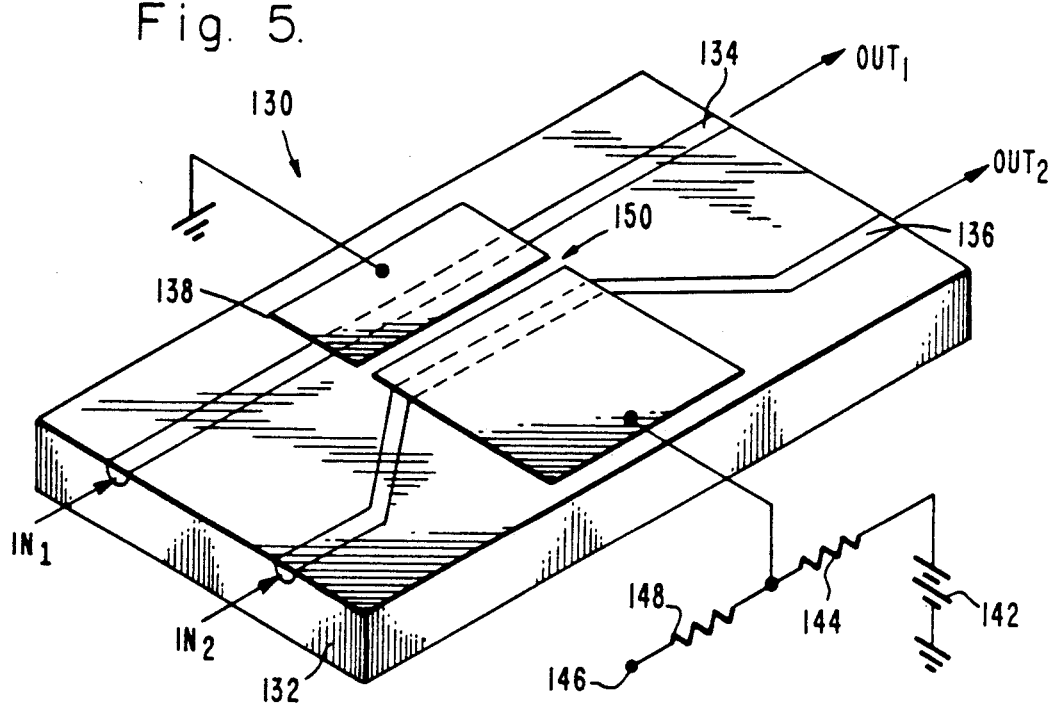
FIG. 5 is a schematic diagram of a electro-optic directional coupler configured to operate in accordance with the present invention.

The scope of the present invention is not limited to a Mach-Zehnder modulator, but includes any type of electro-optic modulator capable of generating harmonics through non-linear electro-optic response. Another example of a modulator embodying the present invention is illustrated in FIG. 5, and designated as 130. The modulator 130 is based on an electro-optic directional coupler as presented in an article entitled "Photonic Switching Using Directional Couplers", by H. Hinton, IEEE Communications Magazine, vol. 25, no. 5, (May 1987). The modulator 130 has a transfer function similar to that illustrated in FIG. 2, and includes a substrate 132 made of an electro-optic material such as $LiNbO_3$, in which is formed two waveguides 134 and 136. Electrodes 138 and 140 are formed over the waveguides 134 and 136 respectively. The electrode 138 is grounded, whereas a bias voltage source 142 applies a voltage to the electrode 140 via a resistor 144 selected to bias the modulator 130 at point A in the graph of FIG. 2 for nonlinear operation and multiple frequency or harmonic generation. An electrical input signal is applied via a terminal 146 and resistor 148 to the electrode 140 in addition to the bias voltage.

The waveguides 134 and 136 are formed very close together at a central portion 150 thereof, such that they are optically coupled together due to the overlap in the evanescent fields of the waveguides. In response to no electrical voltage applied across the electrodes 138 and 140, an optical signal applied to an input IN1 of the waveguide 134 will be cross coupled to an output OUT2 of the waveguide 136. Similarly, an optical signal applied to an optical input IN2 of the waveguide 136 will be cross coupled to an output OUT1 of the waveguide 134. In response to a bias voltage equivalent to $V\pi$ in FIG. 2, the cross coupling will be inhibited, with the input IN1 being coupled to the output OUT1, and the input IN2 being coupled to the output OUT2.

The modulator 130 is operated in accordance with the present invention by applying an optical input signal to either the input IN1 or IN2, and taking an output from either the output OUT1 or OUT2. The bias voltage source 142 is configured to bias the electrode 140 at a point equivalent to point A in FIG. 2, resulting in harmonic generation through non-linear electro-optical response. The optical signal appearing at both of the outputs OUTI and OUT2 will be modulated by even integral multiples of the frequency of the input signal applied to the terminal 146.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim;

1. An electro-optic modulator, having a nonlinear transfer function associated therewith, comprising;
   optical waveguide means formed of electro-optic material, having an optical input for receiving an optical input signal and an optical output;
   electrical modulation input means for applying an electrical input signal to said waveguide means; and
   biasing means for applying an electrical bias voltage to said modulation input means which is determined from said transfer function to cause harmonic modulation of said optical input signal when said electrical input signal is applied to modulate said optical input signal such that said optical input signal is modulated by at least one multiple of the frequency of said electrical input signal while propagating through said waveguide means to said optical output.

2. A modulator as in claim 1, in which said waveguide means and modulation input means constitute a Mach-Zehnder modulator.

3. A modulator as in claim 1, in which said waveguide means comprises two branches extending between said optical input and said optical output, the branches having respective effective optical lengths which vary differently in correspondence with the magnitude of said electrical input signal.

4. A modulator as in claim 3, in which said waveguide means comprises a substrate, said optical input, optical output, and two branches being formed in the substrate, and having a higher index of refraction than the substrate.

5. A modulator as in claim 1, in which said waveguide means comprises two branches having a magnitude of optical coupling therebetween which varies in correspondence with the magnitude of said electrical input signal, said optical input being connected to an optical input of one of the branches, and said optical output being connected to an optical output of one of the branches.

6. A modulator as in claim 1, further comprising a second modulator having a second transfer function associated therewith, the second modulator comprising:
   second optical waveguide means formed of second electro-optic material, having an optical input for receiving a second optical input signal and being connected in parallel with said optical input of said waveguide means, and an optical output;
   photodetector means having an optical input connected to said optical output of said waveguide means, and an electrical output;
   second electrical modulation input means for receiving and applying an electrical output signal from the electrical output of the photodetector means to the second waveguide means; and
   second biasing means for applying a second electrical bias voltage to the second modulation input means which is determined from said second transfer function to cause harmonic modulation of said second optical input signal when the electrical output signal from the photodetector is applied to modulate said second input signal such that said second optical input signal is modulated by at least one multiple of a frequency of the electrical output signal from the photodetector means while propagating through the second waveguide means to the optical output thereof.

7. A modulator as in claim 6, in which said at least one multiple of the frequency of said electrical input signal comprises at least two even integral multiple frequencies thereof, the modulator further comprising:
   filter means connected in circuit between the electrical output of the photodetector means and the second modulation input means for passing only a selected one of said at least two even integral multiple frequencies therethrough.

8. A modulator as in claim 6, further comprising a monolithic substrate in which said waveguide means and the second waveguide means are formed.

9. A modulator as in claim 1, further comprising a second modulator having a second transfer function associated therewith, the second modulator comprising:
   second optical waveguide means formed of second electro-optic material, having an optical input connected to said optical output of said waveguide means for receiving the electro-optic output of said waveguide means, and an optical output;
   second electrical modulation input means for applying a second electrical input signal to the second waveguide means; and
   second biasing means for applying a second electrical bias voltage to the second modulation input means which is determined from said transfer function to cause linear modulation of the electro-optic output of the waveguide means when said second electrical input signal is applied to modulate the electro-optic output of the waveguide means such that the optical signal applied to the optical input of the second waveguide means is modulated by the fundamental frequency of the second electrical input signal while propagating through the second waveguide means to the optical output thereof.

10. A modulator as in claim 9, in which said waveguide means and the second waveguide means each comprise a substrate, the optical input, optical output, and two branches being formed in the respective substrates, and having a higher index of refraction than the substrates respectively.

11. A modulator as in claim 10, in which the substrates are integral and monolithic.

12. A method of operating an electro-optic modulator including waveguide means formed of electro-optic material, having an optical input, an optical output, and an electrical modulation input, said modulator having a transfer function associated therewith, comprising the steps of:
   (a) applying an optical signal to the optical input;
   (b) applying an electrical input signal to the modulation input; and
   (c) applying to the modulation input, in addition to the electrical input signal, an electrical bias voltage which is determined from said transfer function to cause harmonic modulation of said optical input signal when said electrical input signal is applied to modulate said optical input signal such that said optical input signal is modulated by at least one multiple of a frequency of the electrical input signal while propagating through said waveguide means to the optical output.

13. A method as in claim 12, in which step (c) comprises applying the electrical bias voltage as being predetermined at an extreme amplitude value of a cosine square curve of the external modulator transfer function.

14. A method of operating first and second electro-optic modulators, each including optical waveguide means formed of electro-optic material, having an optical input, an optical output, an electrical modulation input, and having a transfer function associated therewith, comprising the steps of:
   (a) connecting the optical inputs of the first and second modulators together to commonly receive an optical input signal;
   (b) connecting an optical input of a photodetector means to the optical output of the first modulator, and connecting an electrical output of the photodetector means to the modulation input of the second modulator;
   (c) applying an electrical input signal to the modulation input of the first modulator;
   (d) applying to the modulation input of the first modulator, in addition to the electrical input signal, an electrical bias voltage which is determined from the transfer function of the first modulator to cause harmonic modulation of the first optical input signal when the electrical input signal is applied to modulate the optical input signal such that the optical input signal is modulated by at least one multiple of the frequency of the electrical input signal while propagating through the first modulator to the optical output thereof;
   (e) applying to the modulation input of the second modulator, in addition to the electrical output signal from the electrical output of the photodetector, an electrical bias voltage which is determined from the transfer function of the second modulator to cause harmonic modulation of the first optical signal when the electrical output of the photodetector is applied to modulate the optical input signal such that the optical input signal is modulated by at least one multiple of the frequency of the electrical output of the photodetector while propagating through the second modulator to the optical output thereof.

15. A method as in claim 14, in which said at least one multiple of said frequency of the electrical input signal which with which the optical input signal is modulated in step (d) includes at least two integral even multiple frequencies thereof, the method further comprising the step, performed between steps (b) and (c), of:
   (f) connecting filter means between the output of the photodetector means and the modulation input of the second modulator, the filter means being configured to pass only one of said at least two integral even multiple frequencies therethrough.

16. A method of operating first and second electro-optic modulators, each including optical waveguide means formed of electro-optic material having an optical input, an optical output, and an electrical modulation input, comprising the steps of:
   (a) connecting the optical input of the first modulator to receive an optical input signal;
   (b) connecting the optical output of the first modulator to the optical input of the second modulator;
   (c) applying an electrical carrier signal to the modulation input of the first modulator;
   (d) applying to the modulation input of the first modulator, in addition to the carrier signal, an electrical bias voltage which is predetermined to cause nonlinear electrical response of the first modulator and modulation of the optical input signal propagating through the first modulator to the optical output thereof with at least one multiple of a frequency of the carrier signal;
   (e) applying an electrical data signal to the modulation input of the second modulator; and
   (f) applying to the modulation input of the second modulator, in addition to the data signal, an electrical bias voltage which is predetermined to cause substantially linear electrical response of the second modulator and substantially linear modulation of the optical signal propagating through the second modulator from the optical input to the optical output thereof with a fundamental frequency of the data signal.

17. A method of electro-optically modulating an input optical signal, comprising the steps of:
(a) dividing the input optical signal between two equal length electro-optical paths and then recombining the signals from the two paths;
(b) biasing the paths to establish a non-linear operating point for one of the paths;
(c) modulating the bias for the non-linearly biased path at a frequency $\omega$ to obtain a combined optical output from the two paths having a component which is an even multiple of $\omega$.

18. A method as in claim 17, in which step (c) comprises setting the bias for the non-linearly biased path at an extreme amplitude value of a cosine square curve of an external modulator transfer function.

19. A method as in claim 17, in which step (b) further comprises grounding the path which is not nonlinearly biased.

20. A method as in claim 17, in which step (a) comprises dividing the optical signal in a Mach-Zehnder modulator configuration.

* * * * *